United States Patent
Rao

(10) Patent No.: US 10,584,595 B2
(45) Date of Patent: Mar. 10, 2020

(54) COOLING DEVICE WITH SMALL STRUCTURED RIB-DIMPLE HYBRID STRUCTURES

(71) Applicant: Shanghai Jiao Tong University, Shanghai (CN)

(72) Inventor: Yu Rao, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 473 days.

(21) Appl. No.: 15/302,776

(22) PCT Filed: Oct. 31, 2014

(86) PCT No.: PCT/CN2014/089969
§ 371 (c)(1),
(2) Date: Oct. 7, 2016

(87) PCT Pub. No.: WO2015/154442
PCT Pub. Date: Oct. 15, 2015

(65) Prior Publication Data
US 2017/0030201 A1    Feb. 2, 2017

(30) Foreign Application Priority Data

Apr. 8, 2014    (CN) .......................... 2014 1 0138196

(51) Int. Cl.
*F01D 5/18*    (2006.01)
*F01D 9/06*    (2006.01)
*F23R 3/00*    (2006.01)

(52) U.S. Cl.
CPC ............. *F01D 5/187* (2013.01); *F01D 9/065* (2013.01); *F23R 3/002* (2013.01); *F23R 3/005* (2013.01);

(Continued)

(58) Field of Classification Search
CPC ............. F01D 5/187; F05D 2260/2212; F05D 2260/22141

See application file for complete search history.

(56) References Cited

U.S. PATENT DOCUMENTS 5,797,726 A    8/1998    Lee
6,237,344 B1   5/2001    Lee
(Continued)

FOREIGN PATENT DOCUMENTS

CN    1727642 A    2/2006
CN    101581235 A   11/2009
(Continued)

OTHER PUBLICATIONS

Zhang, P., et al., "Heat Transfer and Turbulent Flow Structure in Channels With Miniature V-Shaped . . . on One Wall", Journal of Heat Transfer, vol. 141, p. 071903, 2019.

*Primary Examiner* — Igor Kershteyn
*Assistant Examiner* — Brian O Peters
(74) *Attorney, Agent, or Firm* — Yuanzhang Han

(57) ABSTRACT

A cooling device with small structured rib-dimple hybrid structures, comprising a substrate, a cooling channel, a plurality of small structured ribs and a plurality of dimples. The cooling channel, the plurality of small structured ribs and the plurality of dimples are all disposed on the wall surface of the substrate; the plurality of dimples are in a staggered arrangement or in a longitudinal arrangement, forming a dimple array; an upstream wall surface of each dimple or a plurality of dimples is provided with the small structured ribs, thus forming an small structured rib-dimple hybrid structure.

6 Claims, 5 Drawing Sheets

(52) U.S. Cl.
CPC .. *F05D 2250/241* (2013.01); *F05D 2250/712* (2013.01); *F05D 2250/75* (2013.01); *F05D 2260/2212* (2013.01); *F05D 2260/22141* (2013.01); *F23R 2900/03045* (2013.01); *Y02T 50/672* (2013.01); *Y02T 50/676* (2013.01)

(56) References Cited

U.S. PATENT DOCUMENTS

| | | | | |
|---|---|---|---|---|
| 6,644,921 | B2* | 11/2003 | Bunker | F01D 5/147 |
| | | | | 416/97 R |
| 7,186,084 | B2* | 3/2007 | Bunker | F01D 5/187 |
| | | | | 416/96 R |
| 7,373,778 | B2* | 5/2008 | Bunker | F01D 25/12 |
| | | | | 431/351 |
| 7,575,414 | B2* | 8/2009 | Lee | F01D 5/186 |
| | | | | 415/115 |
| 8,506,252 | B1 | 8/2013 | Liang | |
| 2005/0106021 | A1 | 5/2005 | Bunker et al. | |
| 2010/0226791 | A1 | 9/2010 | Fujimura et al. | |
| 2013/0205790 | A1 | 8/2013 | Xu et al. | |

FOREIGN PATENT DOCUMENTS

| | | | |
|---|---|---|---|
| CN | 102588000 | A | 7/2012 |
| CN | 102979583 | A | 3/2013 |
| CN | 103089335 | A | 5/2013 |
| CN | 103542748 | A | 1/2014 |
| CN | 103967621 | A | 8/2014 |
| EP | 0974735 | A2 | 1/2000 |
| WO | 2009028067 | A1 | 5/2009 |

\* cited by examiner

COOLING DEVICE WITH SMALL STRUCTURED RIB-DIMPLE HYBRID STRUCTURES

CROSS-REFERENCE TO RELATED APPLICATIONS

This application is the United States national phase of International Application No. PCT/CN2014/089969 filed Oct. 31, 2014, and claims priority to Chinese Patent Application No. 201410138196.0 filed Apr. 8, 2014, the disclosures of which are hereby incorporated in their entirety by reference.

FIELD OF THE INVENTION

The invention relates to a cooling device, and particularly to a cooling device with small rib-dimple hybrid structures used for a high-temperature component in a gas turbine or an aero-engine. The invention can also be used in technical fields of air-conditioning heat exchanger, automobile heat exchanger, high power electronic device, etc. which require highly efficient heat transfer and cooling.

DESCRIPTION OF THE PRIOR ART

Highly efficient heat transfer and cooling technology is a necessary and key technology for a high-performance gas turbine or an aero-engine, which ensures the high-temperature component of the gas turbine to operate with high efficiency and reliability as well as a sufficient service life. The key high-temperature components which require highly efficient cooling in the gas turbine or an aero-engine usually include: turbine blades, combustion chambers, etc., with a traditional way of thermal protection by means of internal rib and pin fin turbulated cooling, impingement cooling and external air film cooling.

However, with the temperature parameters (>1600° C.) of modern gas turbines or aircraft engines being further improved, the application of the traditional cooling technologies by rib turbulators or pin fins alone has been difficult to sufficiently cool high-temperature components. The dimple vortex generator on a surface is a highly efficient heat transfer structure, which uses the generated strong unsteady vortex to enhance the heat transfer performance of the surface, and meanwhile maintains a very low level of flow resistance. The cooling capacity of the existing gas turbine blades or turbine combustion chamber walls can be further improved by using the dimple and the traditional ribs or pin fins together.

In the cooling of the high-temperature gas turbine components, spherical dimple vortex generators are commonly used as a heat transfer or cooling structure. Although, overall, the spherical dimple vortex generators can significantly strengthen the convective heat transfer, the experimental and numerical calculation studies show that the front half of the spherical dimple has poor heat transfer performance due to the flow separation and low recirculation zone; and at the rear half of the dimple, strong vortex is formed due to the impact and the attachment of the fluid, and the heat transfer performance is greatly enhanced. The heat transfer coefficient of the front half of the spherical dimple is only 25% of that of the rear half thereof, such that in practice the temperature of the wall surface of the front half of the spherical dimple is significantly higher than that of the rear half thereof, which becomes a source of thermal stress. In order to improve the heat transfer performance, the internal vortex structure of the dimple can be improved by changing the shape of the dimple, for example with fillet, chamfer or other advanced structures, such as teardrop shape, to meet the object. However, machining advanced complex teardrop dimple in turbine blades is no easy thing, and the difficulty and cost of machining will be increased, and these factors have limited the overall performance and practical application of the dimple vortex generators.

Thus, those skilled in the art are committed to the development of a dimple vortex generator based advanced convection cooling technology that has a simple design, is easy to implement and has a higher heat transfer performance.

SUMMARY OF THE INVENTION

In view of the above defects with the prior art, the technical problem to be solved by the invention is to provide a dimple vortex generator based advanced convection cooling technology that has a simple design, is easy to implement and has a higher heat transfer performance.

In order to meet the above object, the invention provides a cooling device with small structured rib-dimple hybrid structures, the cooling device comprises a substrate, a cooling channel, a plurality of small structured ribs and a plurality of dimples, wherein the cooling channel is disposed on the wall surface of the substrate; the plurality of dimples are also disposed on the wall surface, forming a dimple array, the dimples being in a staggered arrangement or in a longitudinal arrangement on the wall surface; the small structured ribs are arranged around each or a plurality of dimples; the combination of a plurality of small structured ribs and a plurality of dimples is an small structured rib-dimple hybrid structure.

Further, the small structured rib is composed of two ribs, forming a V-shape with an angle of 30 degree-180 degree or 60 degree-180 degree typically, the direction of the opening of the V-shape pointing toward the adjacent dimple, the apex of the V-shape pointing toward the coming fluid flow.

Further, the cross-section of the rib has a rectangular shape, or a filleted rectangular shape.

Further, the cross-section of the rib has a rectangular shape, or a filleted rectangular shape, or a trapezoidal shape, or a triangular shape.

Further, the width of each rib of the small structured ribs is not larger than 2.0 mm, and the height thereof is not larger than 2.0 mm.

Further, each rib of the small structured ribs has the same height, or the small structured ribs are a combination of ribs with different heights. The height of the rib is usually 0.01 to 0.3 times the height of the cooling channel.

Further, the small structured ribs are distributed on the upstream wall surface of the dimple, the horizontal distance between an endpoint of the small structured rib and a center of the adjacent dimple being 0.5 to 6 times the width of the rib.

Further, the small structured ribs are distributed on the upstream wall surface of the dimple, typically the horizontal distance between an endpoint of the V-shaped small structured rib and a center of the adjacent dimple is 0.5 to 5 times the diameter of the dimple.

Further, the small structured rib is formed on the wall surface of the substrate through investment casting, milling or soldering.

Further, the dimple is shaped as part of a sphere, an ellipsoid, a teardrop or a truncated cone.

Further, the dimple is formed on the wall surface of the substrate through investment casting, milling or stamping.

Further, the depth of the dimple is 0.05 to 0.3 times the diameter of the dimple.

Further, the small structured rib-dimple hybrid structure is combined with rib turbulators or pin fins, forming a rib turbulator-small structured rib-dimple hybrid structure or a pin fin-small structured rib-dimple hybrid structure.

In the present invention, when the cooling fluid flows into the cooling channel, each of the small structured ribs continuously destroys the flow boundary layer, creating a downwashing vortex behind each small structured rib, which will enhance the flow turbulence energy near the wall surface boundary layer upstream the dimple and suppress the generation of flow separation at the leading edge of the dimple, thereby improving the heat transfer performance of the upstream half dimpled wall surface. On the other hand, the flow field inside the dimple will be improved when the downwashing vortex flows into the dimple, in particular the front half zone of the dimple, thereby significantly improving the heat transfer performance in the dimple. The downwashing vortex can also improve the turbulent mixing strength of the flow attachment in the rear half of the dimple, thereby enhancing the heat transfer in this zone and at the downstream wall surface.

As a result of the above, the present invention has the following features: the small structured ribs are mounted on the upstream wall surface of the dimple in the present invention, the fluid passes through each of the small structured ribs to produce downwashing vortex, enhancing the flow turbulence energy in the boundary layer flow upstream the dimple and improving the flow field near the wall surface at the front half of the dimple and the turbulent mixing strength of the flow attachment in the rear half of the dimple, thereby enhancing the heat transfer at the upstream dimpled wall surface, interior and the downstream wall surface of the dimple. As compared with the existing dimple vortex generator, the cooling device with small structured rib-dimple hybrid structures in the present embodiment can overcome the defects residing in the existing dimple vortex generators that the flow turbulence energy is low in the boundary layer flow upstream the dimple, and the flow separation at the leading edge of the dimple easily happens, which lead to low heat transfer. So the present embodiment can significantly improve the comprehensive heat transfer performance, while reducing the flow rate of the cooling fluid under the same cooling load, thereby reducing the power consumption of the pump or blower. In addition, it is simple to have the small structured ribs mounted on the upstream wall surface of the dimple, therefore provides desirable implementability, which has a very important significance to practical applications of enhanced heat transfer or improving cooling performance.

DETAILED DESCRIPTION OF THE PREFERRED EMBODIMENTS

Below with reference to the accompanying figures the embodiments of the present invention will be described in detail, where the embodiments are implemented under the premise of the technical schemes of the present invention, providing detailed description and specific operation procedures, but the scope of the present invention is not intended to be limited to the following Embodiments.

Embodiment 1

Figure 1:
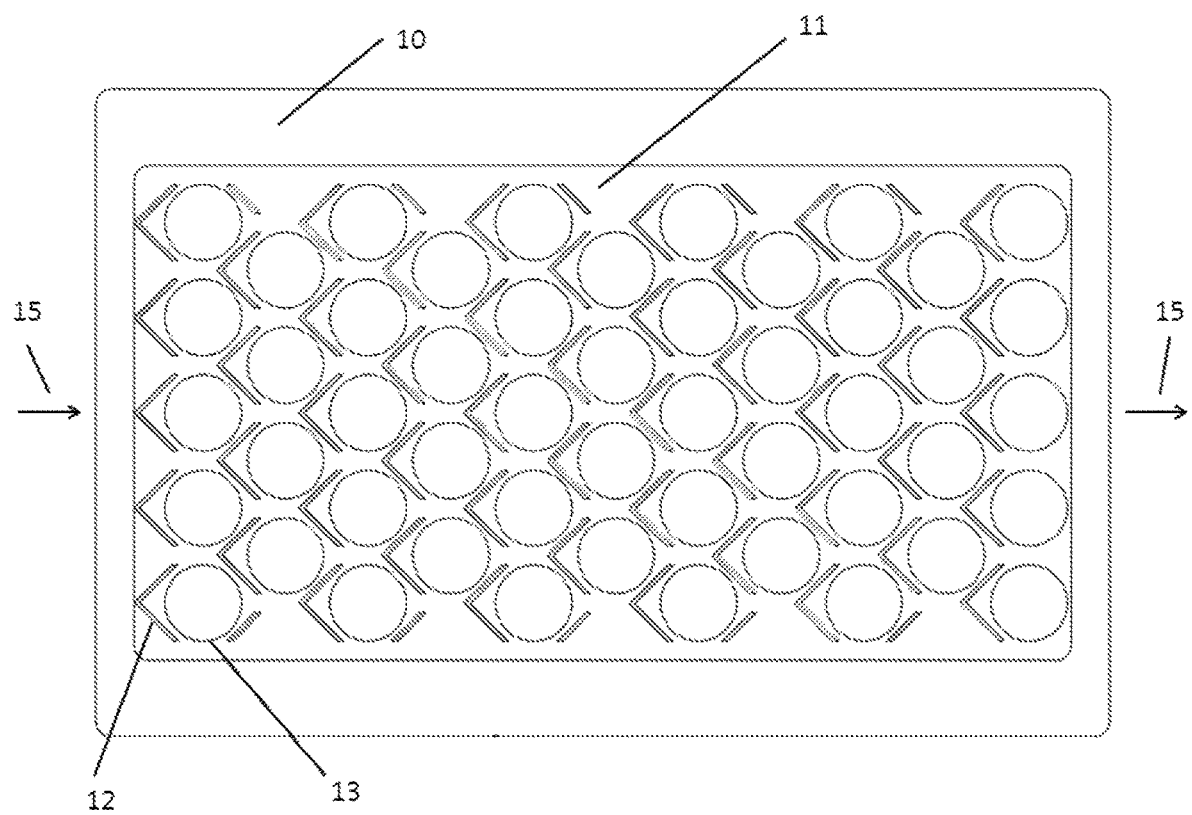
FIG. 1 is a front view of the cooling device with small structured rib-dimple hybrid structures of Embodiment 1 and Embodiment 2 of the invention.
Figure 2:
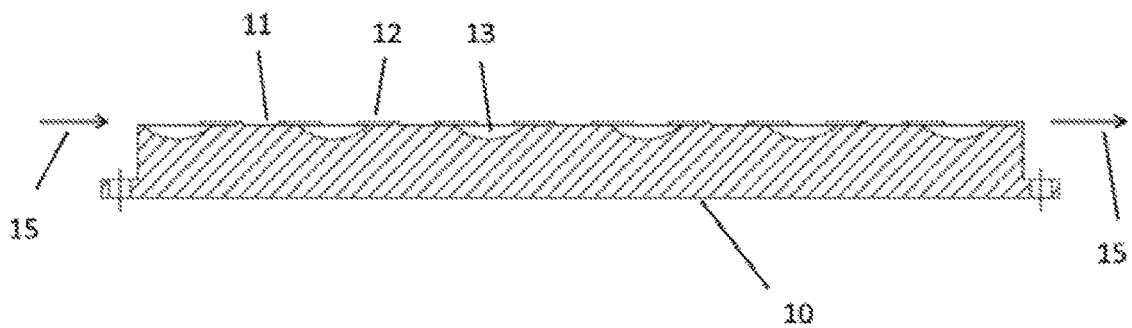
FIG. 2 is a top view of the embodiment shown in FIG. 1.
Figure 3:
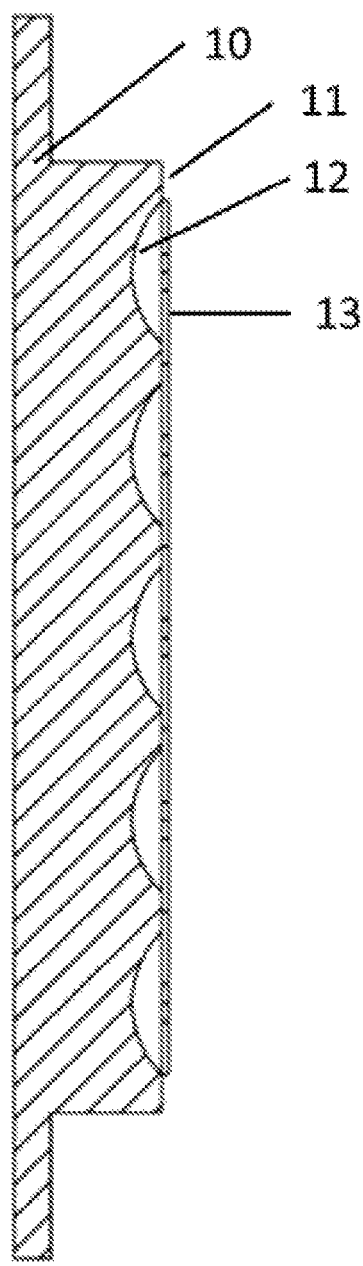
FIG. 3 is a left view of the embodiment shown in FIG. 1.

In this embodiment, as shown in FIGS. 1-3, a cooling device with small structured rib-dimple hybrid structures comprises a substrate 10, a cooling channel 11, a plurality of small structured ribs 12 and a plurality of dimples 13. The cooling channel 11 is disposed on the wall surface of the substrate 10, the plurality of dimples 13 are also disposed on the wall surface in a staggered arrangement, forming a dimple array, the upstream wall surface of each of the dimples being arranged with an small structured rib 12.

The plurality of small structured ribs 12 are formed on the wall surface of the substrate 10 through investment casting, milling or soldering, each of the small structured ribs 12 and the substrate 10 being made of high thermal conductivity materials. Each of the small structured ribs 12 is composed of one rib or two ribs forming a V-shape with an angle of 60 degree to 180 degree. The cross-section of the rib has a rectangular shape, the width of each rib is not larger than 2.0 mm, and the height thereof is not larger than 2.0 mm. The height of each rib is 0.1 to 0.2 times the height of the cooling channel. In addition, the plurality of dimples 13 are formed on the wall surface of the substrate 10 through investment casting, milling or stamping, and the dimple 13 may be shaped as part of a sphere, an ellipsoid or a teardrop. The depth of the dimple 13 is 0.05 to 0.3 times the diameter of the dimple. The horizontal distance between an endpoint of the small structured rib 12 and a center of the adjacent dimple 13 is 0.5 to 6 times the width of the rib of the small structured rib 12. The direction of the opening of the V-shape formed by two ribs of the small structured rib 12 points toward the adjacent dimple 13.

In this embodiment, as shown in FIGS. 1-3, arrow 15 indicates the flow direction of the cooling fluid. When the cooling fluid flows into the cooling channel 11, each of the small structured ribs 12 continuously destroys the flow boundary layer, creating a downwashing vortex behind each small structured rib 12, which will enhance the flow turbulence energy near the wall surface boundary layer upstream the dimple 13 and suppress the generation of flow separation at the leading edge of the dimple 13, thereby improving the heat transfer performance of the upstream dimpled wall surface. On the other hand, the flow field inside the dimple 13 will be improved when the downwashing vortex flows into the dimple 13, in particular the front half zone of the dimple 13, thereby significantly improving the heat transfer performance in the dimple 13. The downwashing vortex can also improve the turbulent mixing strength of the flow attachment in the rear half of the dimple 13, thereby enhancing the heat transfer in this zone and at the downstream wall surface. Conventional dimples will lead to poor thermal conductivity due to flow separation and formation of vortex reflux, while in the present embodiment the small structured ribs induces generation of vortex which significantly improves the inner and outer flow of the dimple 13, improving the heat transfer performance.

Therefore, as compared with the existing dimple vortex generator, the cooling device with small structured rib-dimple hybrid structures in the present embodiment can overcome the defects residing in the existing dimple vortex generators that the flow turbulence energy is low in the boundary layer flow upstream the dimple 13, and the flow at the leading edge of the dimple 13 is easily separated, which lead to low heat transfer. So the present embodiment can significantly improve the comprehensive heat transfer performance, while reducing the flow rate of the cooling fluid under the same cooling load, thereby reducing the power consumption of the pump or blower and saving materials. In addition, it is simple to have the small structured ribs 12 mounted on the upstream wall surface of the dimples 13, therefore provides desirable implementability, which has a very important significance to practical applications of enhanced heat transfer or improving cooling performance.

Embodiment 2

In this embodiment, as shown in FIGS. 1-3, a cooling device with small structured rib-dimple hybrid structures comprises a substrate 10, a cooling channel 11, a plurality of small structured ribs 12 and a plurality of dimples 13. The cooling channel 11 is disposed on the wall surface of the substrate 10, the plurality of dimples 13 are also disposed on the wall surface in a staggered arrangement, forming a dimple array, the upstream wall surface of each of the dimples being arranged with an small structured rib 12.

The plurality of small structured ribs 12 are formed on the wall surface of the substrate 10 through investment casting, milling or soldering, each of the small structured ribs 12 and the substrate 10 being made of high thermal conductivity materials. Each of the small structured ribs is composed of one rib or two ribs forming a V-shape with an angle of 30 degree to 180 degree. The cross-section of the rib has a rectangular shape, the height of each rib may be the same, and may also be different. In the present embodiment, the height of the rib is 0.01 to 0.3 times the height of the cooling channel. In addition, the plurality of dimples 13 are formed on the wall surface of the substrate 10 through investment casting, milling or stamping, and the dimple 13 may be shaped as part of a sphere, an ellipsoid, a teardrop or a truncated cone. The depth of the dimple 13 is 0.05 to 0.3 times the diameter of the dimple. The horizontal distance between an endpoint of the V-shaped small structured rib 12 and a center of the adjacent dimple 13 is 0.5 to 5 times the width of the rib of the small structured rib 12. The direction of opening of the V-shape formed by two ribs of the small structured rib 12 points toward the adjacent dimple 13, and the apex of the V-shape points toward the coming fluid flow.

Figure 4:
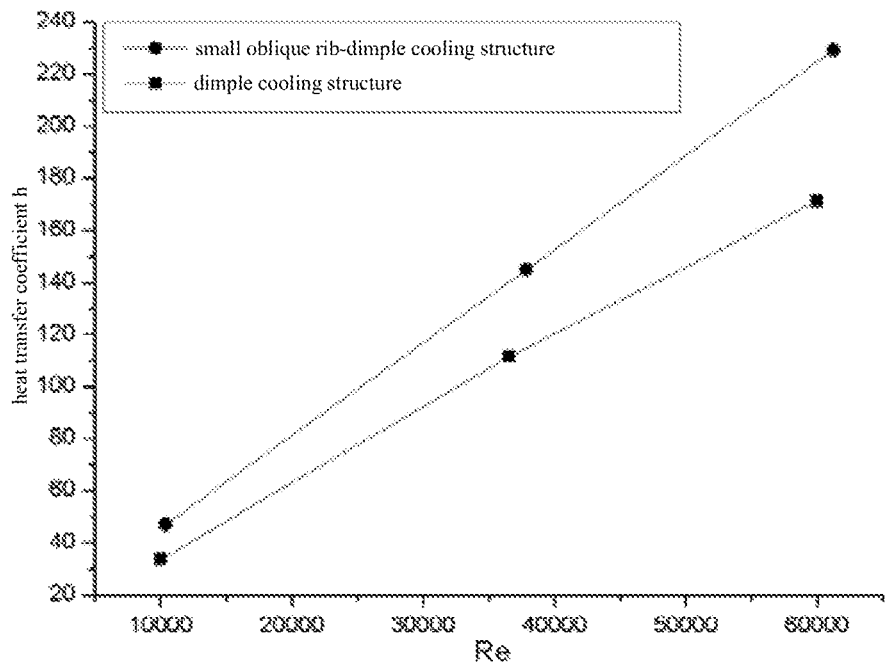
FIG. 4 is a comparison diagram of convective heat transfer coefficient of the small structured rib-dimple cooling structure of the invention with respect to the corresponding dimple cooling structure.

FIG. 4 is a comparison diagram of convective heat transfer coefficient of the small structured rib-dimple cooling structure with respect to the corresponding dimple cooling structure, which illustrates the comparison of the convective heat transfer coefficient between the small structured rib-dimple cooling structure provided by the embodiment and the corresponding dimple-only cooling structure under different Reynolds conditions, wherein the dimple arrangement of the dimple-only cooling structure surface has the same geometry and arrangement as the dimples in the small structured rib-dimple cooling structure, and the height of the small structured rib in the small structured rib-dimple cooling structure is 1 mm. The convective heat transfer coefficient represents the magnitude of the surface heat transfer power per unit area. The results in FIG. 4 show that the small structured rib-dimple cooling structure in the embodiment of the present invention has a convective heat transfer coefficient 30% higher than that of the corresponding dimple cooling structure, thus demonstrating that the small structured rib-dimple structure has a significantly improved heat transfer/cooling performance.

Embodiment 3

Figure 5:
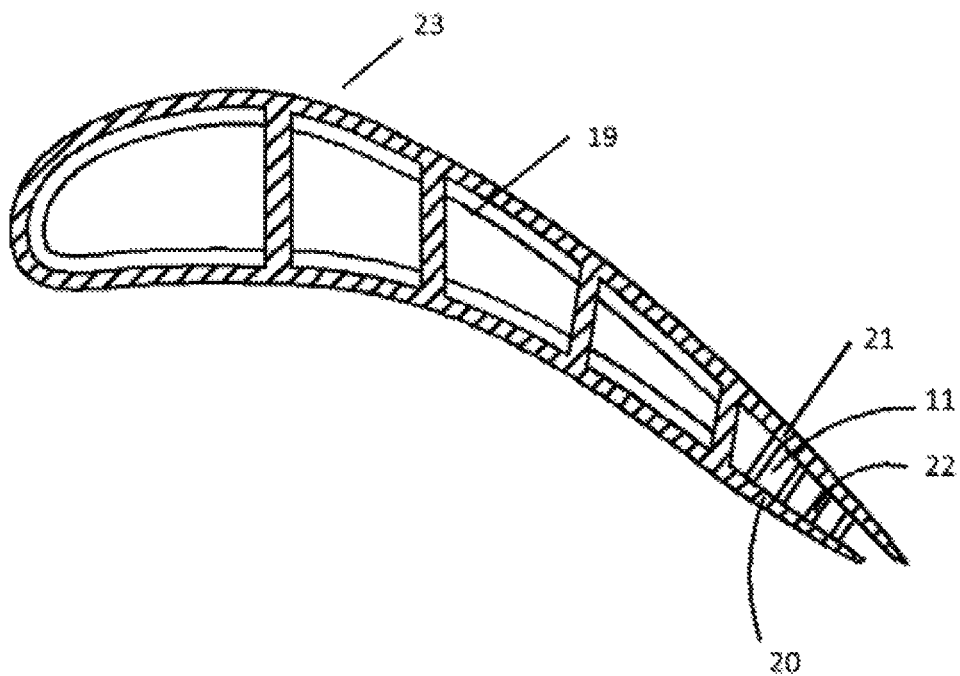
FIG. 5 is a cross-sectional perspective view of the internal cooling structure of the gas turbine blades of Embodiment 3 and Embodiment 4 of the invention.
Figure 6:
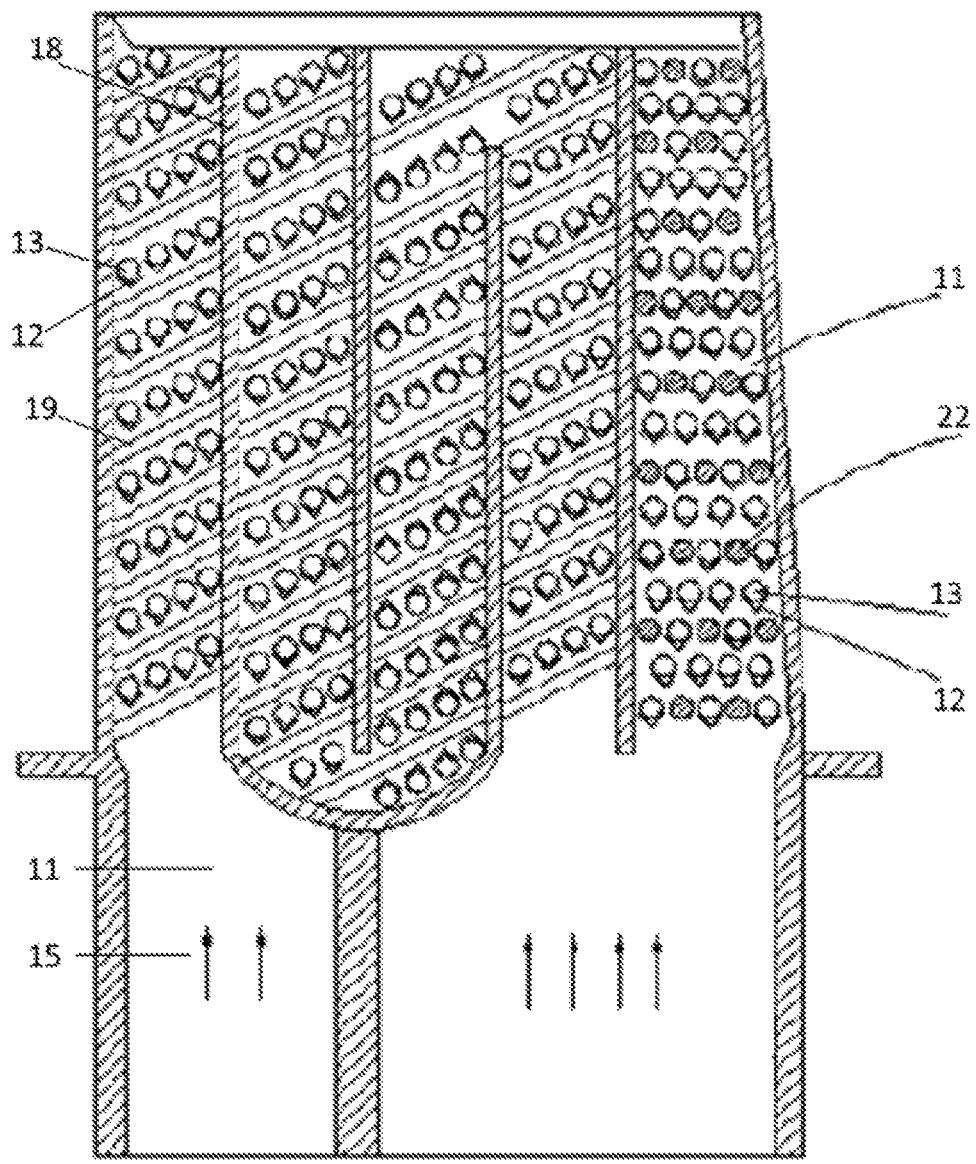
FIG. 6 is a longitudinal cross-sectional perspective view of the gas turbine blades of Embodiment 3 and Embodiment 4 of the invention, with two hybrid cooling structures of rib-small structured rib-dimple and pin fin-small structured rib-dimple.
Figure 7:
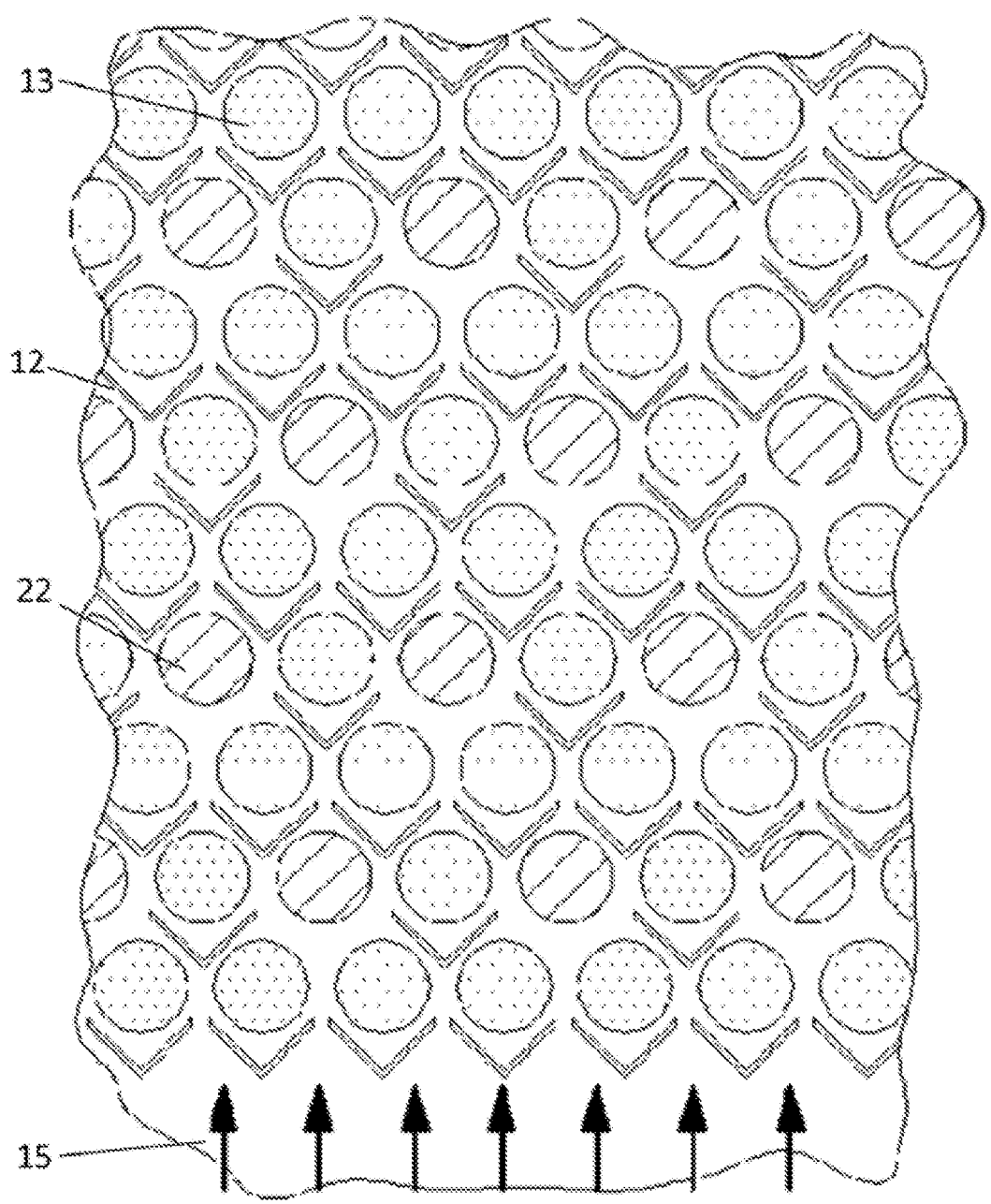
FIG. 7 is a sectional perspective view of the pin fin-small structured rib-dimple hybrid structure of the embodiment shown in FIG. 6.

In this embodiment, as shown in FIGS. 5-7, a gas turbine blade with two hybrid cooling structures of rib-small structured rib-dimple and pin fin-small structured rib-dimple includes a cooling channel 11, a pressure side wall surface 20, a suction side wall surface 21, and further includes a plurality of ribs 19, a plurality of pin fins 22, a plurality of dimples 13 and a plurality of small structured ribs 12. The direction of arrow 15 indicates the flow direction of the cooling fluid. The cooling channel 17 is arranged between the pressure side wall surface 20 and the suction side wall surface 21, the plurality of ribs 19 are arranged inside the cooling channel 11 between the adjacent baffles 18, and the plurality of ribs 19 are inclined by the same angle along the flow direction. The upstream wall surface of each of the ribs 19 is arranged with a row of dimples 13.

The plurality of pin fins 22 and the plurality of dimples 13 are arranged at the trailing edge of the blade, and the pin fins 22 are formed between the pressure side wall surface 20 and the suction side wall surface 21 by investment casting. The pin fins 22 are connected to the pressure side wall surface 20 and the suction side wall surface 21. The cross-section of the pin fin 22 has a circular column shape. The pin fins 22 are in a staggered arrangement inside the cooling channel 11; the pressure side wall surface 20 and the suction side wall surface 21 are provided with dimples 13 positioned on the wall surfaces at the minimum flow cross-section between every two pin fins 22 of each row of pin fins 22 in a transverse direction; and between every two pin fins 22 in a longitudinal direction (flow direction 15). The plurality of dimples 13 are formed on the wall surface of the blade through investment casting, milling or stamping, and the shape of the dimple 13 may be part of a sphere, ellipsoid or teardrop. The depth of the dimple 13 is 0.05 to 0.3 times the diameter thereof. The pin fins-dimples are in a staggered arrangement on the wall surface.

In addition, the upstream wall surface of each of the dimples is arranged with an small structured rib. The plurality of small structured ribs are formed on the blade wall surface through investment casting, milling or soldering, and each small structured rib 12 is made of high thermal conductivity material. Each of the small structured ribs 12 is composed of one rib or two ribs forming a V-shape with an angle of 60 degree to 180 degree. The cross-section of the rib has a rectangular shape, the width of each rib is not larger than 2.0 mm, and the height thereof is not larger than 2.0 mm. The horizontal distance between an endpoint of the small structured rib 12 and a center of the adjacent dimple 13 is 0.5 to 6 times the width of the rib of the small structured rib 12. The direction of opening of the V-shape formed by two ribs of the small structured rib 12 points toward the adjacent dimple 13.

In this embodiment, when the cooling fluid flows by, the dimples 13 enhance the heat transfer performance of the surface by using the generated strong unsteady vortex, while maintaining a very low level of flow resistance, and the generated vortex induced by the small structured rib 12 can overcome the defects that the flow turbulence energy is low in the boundary layer flow upstream the dimple 13, and the flow at the leading edge of the dimple 13 is easily separated, thereby further improving the cooling capacity of the existing gas turbine blade which relies mainly on turbulated cooling by ribs and pin fins, thus saving the cooling air consumption of the gas turbine and improving gas turbine performance.

Embodiment 4

In this embodiment, as shown in FIGS. 5-7, a gas turbine blade 23 with two hybrid cooling structures of rib-small structured rib-dimple and pin fin-small structured rib-dimple includes a cooling channel 11, a pressure side wall surface 20, a suction side wall surface 21, and further includes a plurality of ribs 19, a plurality of pin fins 22, a plurality of dimples 13 and a plurality of small structured ribs 12. The direction of arrow 15 indicates the flow direction of the cooling fluid. The cooling channel 17 is arranged between the pressure side wall surface 20 and the suction side wall surface, the plurality of ribs 19 are arranged inside the cooling channel 11 between the adjacent baffles 18, and the plurality of ribs 19 are inclined by the same angle along the flow direction. The upstream wall surface of each of the ribs 19 is arranged with a row of dimples 13.

The plurality of pin fins 22 and the plurality of dimples 13 are arranged at the trailing edge of the blade, and the pin fins 22 are formed between the pressure side wall surface 20 and the suction side wall surface 21 by investment casting. The pin fins 22 are connected to the pressure side wall surface 20 and the suction side wall surface 21. The cross-section of the pin fin 22 has a circular column shape. The pin fins 22 are in a staggered arrangement inside the cooling channel 11; the pressure side wall surface 20 and the suction side wall surface 21 are provided with dimples 13 positioned on the wall surfaces at the minimum flow cross-section between every two pin fins 22 of each row of pin fins 22 in a transverse direction; and between every two pin fins 22 in a longitudinal direction (flow direction 15). The plurality of dimples 13 are formed on the wall surface of the blade through investment casting, milling or stamping, and the shape of the dimple 13 may be part of a sphere, ellipsoid, teardrop, or truncated cone. The depth of the dimple 13 is 0.05 to 0.3 times the diameter thereof. The pin fins-dimples are in a staggered arrangement on the wall surface.

In addition, the upstream wall surface of each of the dimples is arranged with an small structured rib. The plurality of small structured ribs are formed on the blade wall surface through investment casting, milling or soldering, and each small structured rib 12 is made of high thermal conductivity material. Each of the small structured ribs is composed of one rib or two ribs forming a V-shape with an angle of 30 degree to 180 degree. The cross-section of the rib has a rectangular shape, each rib of the small structured ribs has the same height, and may also has different heights. In this embodiment, the height of the rib is 0.01 to 0.3 times the height of the cooling channel, and the horizontal distance between an endpoint of the small structured rib 12 and a center of the adjacent dimple 13 is 0.5 to 5 times the width of the rib of the small structured rib 12. The direction of opening of the V-shape formed by two ribs of the small structured rib 12 points toward the adjacent dimple 13, and the apex of the V-shape points toward the coming fluid flow.

The foregoing provides preferred embodiments of the invention in detail. It should be understood that those of ordinary skills in the art can make multiple amendments and changes according to the conception of this invention without any inventive work. Therefore, all the technical schemes gained from logical analysis, deductions or limited experiments based on the present invention by those skilled in the art should be considered within the protection scope defined in the Claims.

附图里的文字：
图 4
微小斜肋-凹陷冷却结构 small structured rib-dimple cooling structure
凹陷冷却结构 dimple cooling structure
换热系数 heat transfer coefficient

The invention claimed is:
1. A cooling device with structured rib-dimple hybrid structures, comprising a substrate, a cooling channel, a plurality of structured rib-dimple hybrid structures, wherein
    the cooling channel is disposed on a wall surface of the substrate;
    the structured rib-dimple hybrid structures are also disposed on the wall surface, forming an array of structured rib-dimple hybrid structures, the structured rib-dimple hybrid structures being in a staggered arrangement or in a longitudinal arrangement on the wall surface;
    each of the structured rib-dimple hybrid structures is an integrated structure, which comprises one dimple with one structured rib at an upstream wall surface;
    wherein the structured rib is composed of two ribs forming a V-shape rib with a closed apex, each structured rib is positioned upstream each dimple with the closed apex of the V-shape rib pointing toward the coming fluid flow and the opening of the V-shape rib pointing toward the downstream dimple;
    the width of the structured rib is not larger than 2.0 mm, and the height thereof is not larger than 2.0 mm.
2. The cooling device with structured rib-dimple hybrid structures according to claim 1, wherein each structured rib-dimple hybrid structure is formed on the wall surface of the substrate through investment casting, milling or soldering.
3. The cooling device with structured rib-dimple hybrid structures according to claim 1, wherein each dimple is shaped as part of a sphere, an ellipsoid or a teardrop.
4. The cooling device with structured rib-dimple hybrid structures according to claim 1, wherein each dimple is formed on the wall surface of the substrate through investment casting, milling or stamping.
5. The cooling device with structured rib-dimple hybrid structures according to claim 1, wherein the depth of each dimple is 0.05 to 0.3 times the diameter of the dimple.
6. The cooling device with structured rib-dimple hybrid structures according to claim 1, wherein a cross-section of either of the two ribs has a rectangular shape, a filleted rectangular shape, a trapezoidal shape, or a triangular shape.

* * * * *